(12) United States Patent
Yan et al.

(10) Patent No.: US 12,506,685 B2
(45) Date of Patent: *Dec. 23, 2025

(54) METHOD FOR FORWARDING VECTOR PACKET PROCESSING

(71) Applicant: Airoha Technology (Suzhou) Limited, Suzhou (CN)

(72) Inventors: Fei Yan, Suzhou (CN); Peng Du, Suzhou (CN)

(73) Assignee: Airoha Technology (Suzhou) Limited, Suzhou (CN)

( * ) Notice: Subject to any disclaimer, the term of this patent is extended or adjusted under 35 U.S.C. 154(b) by 71 days.

This patent is subject to a terminal disclaimer.

(21) Appl. No.: 18/762,123

(22) Filed: Jul. 2, 2024

(65) Prior Publication Data
US 2024/0356841 A1 Oct. 24, 2024

Related U.S. Application Data

(63) Continuation of application No. 17/843,454, filed on Jun. 17, 2022, now Pat. No. 12,058,043.

(30) Foreign Application Priority Data

Dec. 21, 2021 (TW) .................................. 110147810

(51) Int. Cl.
*H04L 45/00* (2022.01)
*H04L 41/16* (2022.01)
*H04L 45/42* (2022.01)
*H04L 45/50* (2022.01)

(52) U.S. Cl.
CPC ............ *H04L 45/566* (2013.01); *H04L 41/16* (2013.01); *H04L 45/42* (2013.01); *H04L 45/507* (2013.01)

(58) Field of Classification Search
None
See application file for complete search history.

(56) References Cited

U.S. PATENT DOCUMENTS

| | | | |
|---|---|---|---|
| 6,947,415 B1 * | 9/2005 | Nagaraj | H04L 45/02 370/413 |
| 6,954,463 B1 * | 10/2005 | Ma | H04L 45/583 370/392 |
| 7,672,302 B2 * | 3/2010 | Wybenga | H04L 45/586 370/389 |

(Continued)

*Primary Examiner* — Ranodhi Serrao
(74) *Attorney, Agent, or Firm* — BACON & THOMAS, PLLC

(57) ABSTRACT

A method for forwarding a vector packet processing (VPP) is applicable to a forwarding path. The forwarding path includes an interface entrance, a data plane development kit (DPDK) input end, an entrance labeling-and-categorizing plug-in unit, one or more intermediate nodes, a Tx output end, an exit labeling-and-categorizing plug-in unit, and an interface exit. The vector packet processing forwarding method includes: executing a learning-and-recording mode for a preceding packet to obtain a learning result, and in the learning-and-recording mode, having the preceding packet entirely pass through the forwarding path; and executing an optimized acceleration mode for a subsequent packet, and in the optimized acceleration mode, based on the learning result, having the subsequent packet detour at least one intermediate node of the one or more intermediate nodes in the forwarding path.

13 Claims, 8 Drawing Sheets

(56) References Cited

U.S. PATENT DOCUMENTS

| | | | | |
|---|---|---|---|---|
| 9,525,633 B2* | 12/2016 | Yu | ........................ | H04L 49/1569 |
| 10,469,357 B2* | 11/2019 | Kananda | ................ | H04L 45/306 |
| 2017/0250869 A1* | 8/2017 | Voellmy | .............. | H04L 41/0894 |
| 2019/0124704 A1* | 4/2019 | Sun | ......................... | H04L 47/24 |
| 2019/0222504 A1* | 7/2019 | Kananda | ................. | H04L 45/38 |
| 2019/0363977 A1* | 11/2019 | Lim | ........................ | H04L 45/64 |

* cited by examiner

| Hash value | IN_IF | 5-tuple | Tunnel? | Forwarding packet modification | Next-node | OUT_IF | Overtime |
|---|---|---|---|---|---|---|---|
| 220 | Eth01 | x,y,z,p,q | Yes | VxLAN(50 bytes) | Tx output end | Eth02 | 30s |

FIG.7

METHOD FOR FORWARDING VECTOR PACKET PROCESSING

CROSS REFERENCE TO RELATED APPLICATION

This application is a continuation (CA) of U.S. patent application for "METHOD FOR FORWARDING VECTOR PACKET PROCESSING", U.S. application Ser. No. 17/843,454 filed Jun. 17, 2022, and the subject matter of which is incorporated herein by reference.

This application claims the benefits of the Taiwan Patent Application Serial Number 110147810, filed on Dec. 21, 2021, the subject matter of which is incorporated herein by reference.

BACKGROUND OF THE INVENTION

1. Field of the Invention

The present invention relates to a method for forwarding a vector packet processing (VPP), which is enabled to enhance the forwarding performance of the VPP.

2. Description of Related Art

With an introduction of a growing number of an overlay Network protocol, such as Virtual Extensible LAN (VxLAN), Network data drastically increase as a type of network service increases. Network apparatus needs to be continuously updated to satisfy the requirement of complicated protocols. In particular, various tunnel protocols have the demanding periphery of the Network apparatus. Intellectualization for the Network functionality becomes increasingly important.

On the other hand, with the rapid development of virtualization, a need for band width is significantly increasing, which means that executing Network protocols by means of software can create an encumbering overhead on the resource of Central Processing Units (CPUs), resulting in that the remaining resource of CPUs for applications is less. As a result, the hardware unloading for Network functionality is inevitable.

It can be seen that, the existing Network apparatus encounter problems in both software and hardware. The former is confronted with the complexity of Network plane, while the latter is confronted with the Network interface band width varying with Moore's law.

As to the above problems, current solution mainly lies in that, for software acceleration, a concrete program includes a software optimization and acceleration method in which the VPP combines with data plane development kit (DPDK), and a technology of peripheral component interconnect express (PCIE) single root input/output virtualization (SR-IVO); for hardware acceleration, a concrete program includes the usage of an application specific integrated circuit (ASIC) for implementing common Network functions, and the usage of a programmable network function provided by network interface Controllers (NICs) of field programmable gate arrays (FPGAs).

However, the software acceleration is with limited effect, and a lot of resources of CPUs are still occupied. The hardware acceleration is hardly realized in view of concern about the cost of general network interface cards by means of ASIC and FPGA NIC.

In conclusion, software needs to be intelligent, and thus to be flexible and programmable; hardware needs a processing capability with high performance. Hence, how to juggle the intellectualization and high performance has become a problem to be solved in Network expansion.

Therefore, the technical problem of the present invention lies in how to juggle the intelligence and the performance on the premise of intellectualization of the general network interface card.

SUMMARY OF THE INVENTION

Therefore, the object of the present invention is to provide an optimized method for forwarding a vector packet processing in which the labeling-and-categorizing plug-in units are added, allowing the best of both world of the intellectualization and the high performance.

More specifically, to achieve the object, according to one aspect of the present invention, a method for forwarding a vector packet processing (VPP) is provided. The method is applicable to a forwarding path. The forwarding path includes an Ethernet entrance, a data plane development kit (DPDK) input end, an entrance labeling-and-categorizing plug-in unit, one or more intermediate nodes, a Tx output end, an exit labeling-and-categorizing plug-in unit, and an Ethernet exit. The vector packet processing forwarding method includes:

executing a learning-and-recording mode for a preceding packet to obtain a learning result, and in the learning-and-recording mode, having the preceding packet entirely pass through the forwarding path; and executing an optimized acceleration mode for a subsequent packet, and in the optimized acceleration mode, based on the learning result, having the subsequent packet bypass some intermediate nodes of the one or more intermediate nodes in the forwarding path.

Optionally, or preferably, the learning-and-recording mode includes:

receiving the preceding packet by the Ethernet entrance, the preceding packet including 5-tuple; and adding an entrance information by the DPDK input end based on the preceding packet, wherein the learning result includes the 5-tuple and the entrance information.

Optionally, or preferably, the learning-and-recording mode further includes:

generating a hash value of the preceding packet by the entrance labeling-and-categorizing plug-in unit based on the 5-tuple of the preceding packet, wherein the learning result includes the hash value.

Optionally, or preferably, the learning-and-recording mode further includes:

storing an entrance labeling-and-categorizing information into a memory by the entrance labeling-and-categorizing plug-in unit, wherein the entrance labeling-and-categorizing information includes the 5-tuple, the entrance information, and the hash value, and wherein the learning result includes the entrance labeling-and-categorizing information.

Optionally, or preferably, the learning-and-recording mode further includes:

processing the preceding packet by some of the intermediate nodes of the one or more intermediate nodes and generating a processed packet, the processed packet including an exit labeling-and-categorizing information, wherein the learning result includes the exit labeling-and-categorizing information;

storing the exit labeling-and-categorizing information of the processed packet into the memory by the exit labeling-and-categorizing plug-in unit; and outputting the processed packet to the Tx output end by the exit labeling-and-categorizing plug-in unit.

Optionally, or preferably, the exit labeling-and-categorizing information includes an auxiliary information and a next-node.

Optionally, or preferably, the method for forwarding a vector packet processing further includes:

receiving the subsequent packet by the Ethernet entrance, the subsequent packet including another 5-tuple;

adding another entrance information to the subsequent packet by the DPDK output end based on the subsequent packet; and generating another hash value of the subsequent packet based on the subsequent packet, and accessing the memory based on the other hash value by the entrance labeling-and-categorizing plug-in unit.

Optionally, or preferably, when the other hash value of the subsequent packet is not equal to the hash value of the preceding packet, the entrance labeling-and-categorizing plug-in unit requires the subsequent packet to entirely pass through the forwarding path.

Optionally, or preferably, the method for forwarding a vector packet processing further includes:

comparing the other hash value with the hash value and comparing the other entrance information with the entrance information by the entrance labeling-and-categorizing plug-in unit, wherein when the other 5-tuple is equal to the 5-tuple and the other entrance information equal to the entrance information, executing the optimized acceleration mode.

Optionally, or preferably, the optimized acceleration mode further includes: modifying the subsequent packet into the processed packet according to the auxiliary information of the exit labeling-and-categorizing information, and directly outputting the processed packet to a next node in the forwarding path according to the next-node of the exit labeling-and-categorizing information by the entrance labeling-and-categorizing plug-in unit.

Optionally, or preferably, the next node is the Tx output end or one node after some of the intermediate nodes that process the preceding packet in the one or more intermediate nodes.

Optionally, or preferably, when the other 5-tuple is not equal to the 5-tuple, or when the other entrance information is not equal to the entrance information, the entrance labeling-and-categorizing plug-in unit requires the subsequent packet to entirely pass through the forwarding path.

Optionally, or preferably, the exit labeling-and-categorizing plug-in unit sets an overtime and stores the overtime into the memory along with the exit labeling-and-categorizing information, the overtime indicating a survival time of the entrance labeling-and-categorizing information and the exit labeling-and-categorizing information stored in the memory.

In conclusion, in an optimized method for forwarding a vector packet processing of the present invention, with labeling-and-categorizing plug-in, insufficiency of existing approaches is improved by executing a learning-and-recording mode and an optimized acceleration mode. As a result, the best of both world of the intellectualization and the high performance is achieved.

Other objects, advantages, and novel features of the invention will become more apparent from the following detailed description when taken in conjunction with the accompanying drawings.

BRIEF DESCRIPTION OF THE DRAWINGS

FIG. 7 shows an example of the categorizing information according to another embodiment of the present invention.

DETAILED DESCRIPTION OF THE EMBODIMENT

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as "first" or "second", are used to distinguish a plurality of elements having the same name, and it does not mean that there is essentially a level, a rank, an executing order, or a manufacturing order among the elements, except otherwise specified. A "first" element and a "second" element may exist together in the same component, or alternatively, they may exist in different components, respectively. The existence of an element described by a greater ordinal number does not essentially mean the existent of another element described by a smaller ordinal number.

The so-called "include", "comprise", "have", or "contain" refers to include but not limited thereto, except otherwise specified.

Moreover, in the present specification, the terms, such as "system", "apparatus", "device", "module", or "unit", refer to an electronic element, or a digital circuit, an analogous circuit, or other general circuit, composed of a plurality of electronic elements, and there is not essentially a level or a rank among the aforementioned terms, except otherwise specified.

Moreover, a terminal or a server may include the aforementioned element(s), or be implemented in the aforementioned manner(s).

Referential Example

Figure 1:
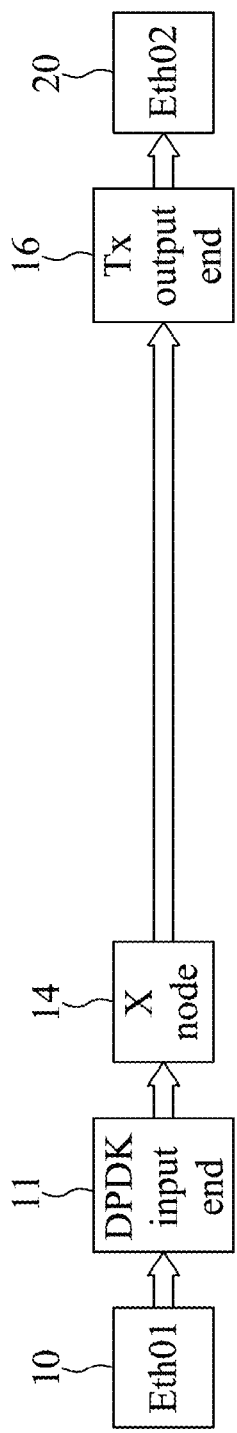
FIG. 1 shows a simplified path of a vector packet processing.

FIG. 1 shows a simplified forwarding path of a vector packet processing.

The vector packet processing is a system for packet processing. The system consists of a plurality of nodes and network function of the system is realized by the plurality of nodes. The plurality of nodes is connected to each other. A next node is determined in advance at a current node, so that an entire processing flow (i.e., the forwarding path) can be determined.

As shown in FIG. 1, the vector packet processing is determined, depending on various protocols and Network strategies. A packet is in sequence received by an Ethernet entrance (Eth01) 10, passed through a data plane development kit (DPDK) input end 11, an intermediate node (i.e., an X node 14 in the example of FIG. 1), a Tx output end 16, and finally be sent out through an Ethernet exit (Eth02) 20. This is the packet's forwarding path. The intermediate node represents one type of protocols. When a packet passes through the intermediate node, the intermediate node executes matching, modifying, or filtering to the packet.

In the referential example, in general, the X node 14 can be a filter node, an access control list (ACL) node, an L3 node, a network address translation (NAT) node, a tunnel node, an IPSec node, a VxLAN node, etc. In the following description, a VxLAN node is adopted as the X node 14 for an example to compare with the referential example. In addition, it should be noted that, a forwarding path of a vector packet processing may include a plurality of intermediate nodes, not just one node. While only one intermediate node, X node 14, is shown in FIG. 1, the forwarding path may include any number of intermediate nodes. The number of intermediate nodes can be extended beyond one node, and the aspects herein are not limited by such example.

Figure 2:
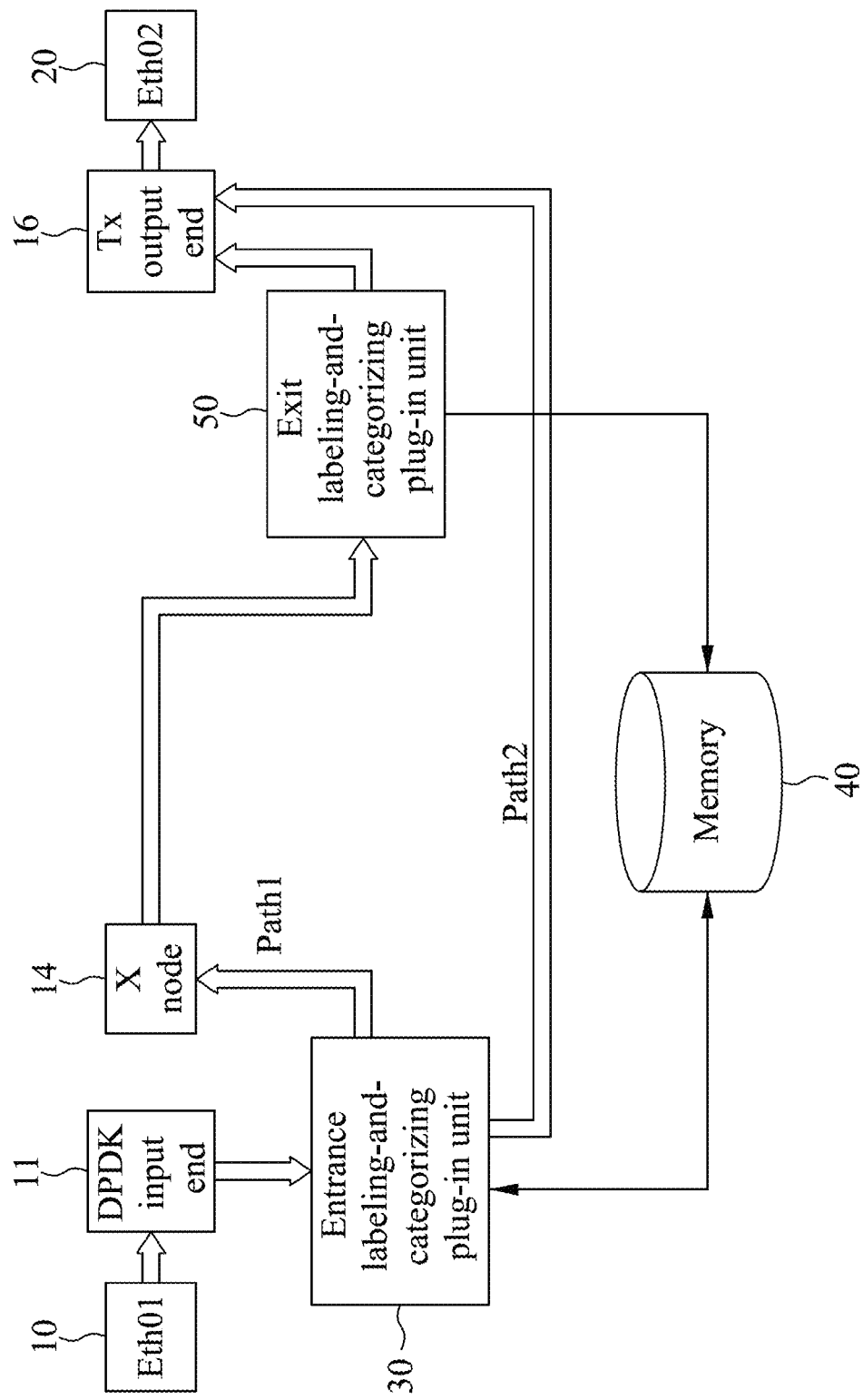
FIG. 2 shows a forwarding path of a vector packet processing according to an embodiment of the present invention.

FIG. 2 shows a forwarding path of a vector packet processing according to an embodiment of the present invention.

In the present embodiment, the forwarding path shown in FIG. 2 is obtained by improving the simplified forwarding path of the referential example shown in FIG. 1. The simplified forwarding path includes an Ethernet entrance 10, a DPDK input end 11, an X node 14, a Tx output end 16, and an Ethernet exit 20. Firstly, a packet entrance is defined after the Ethernet entrance 10, and a packet exit is defined before the Ethernet exit 20. Secondly, an entrance labeling-and-categorizing plug-in unit 30 and an exit labeling-and-categorizing plug-in unit 50 can be arranged at the packet entrance and the packet exit, respectively.

Functions and effects of the entrance labeling-and-categorizing plug-in unit 30 and the exit labeling-and-categorizing plug-in unit 50 will be described in the following descriptions. Here, it should be particularly noted that, the entrance labeling-and-categorizing plug-in unit 30 is preferably arranged close to the packet entrance, and the exit labeling-and-categorizing plug-in unit 50 is preferably arranged close to the packet exit, such that the processing cost for a packet can be reduced, and therefore the forwarding performance for a packet can be improved. Therefore, in the examples from FIG. 2 to FIG. 5, the entrance labeling-and-categorizing plug-in unit 30 is arranged after the DPDK input end 11 and the exit labeling-and-categorizing plug-in unit 50 is arranged before the Tx output end 16.

As can be seen in FIG. 2, an architecture of hardware includes an Ethernet entrance 10, a DPDK input end 11, an entrance labeling-and-categorizing plug-in unit 30, an X node 14 serving as the intermediate node, a Tx output end 16, and an Ethernet exit 20, in the forwarding path of the vector packet processing according to an embodiment of the present invention.

Still with reference to FIG. 2, in the forwarding path of a vector packet processing of FIG. 2, the forwarding path of the vector packet processing includes a Path 1 and a Path 2, wherein Path 1 is a path in a learning-and-recording mode of a vector packet processing, while Path 2 is a path in an optimized acceleration mode of a vector packet processing. The paths of the two modes of the vector packet processing will be described in the following descriptions in detail.

(Learning-And-Recording Mode)

Figure 3:
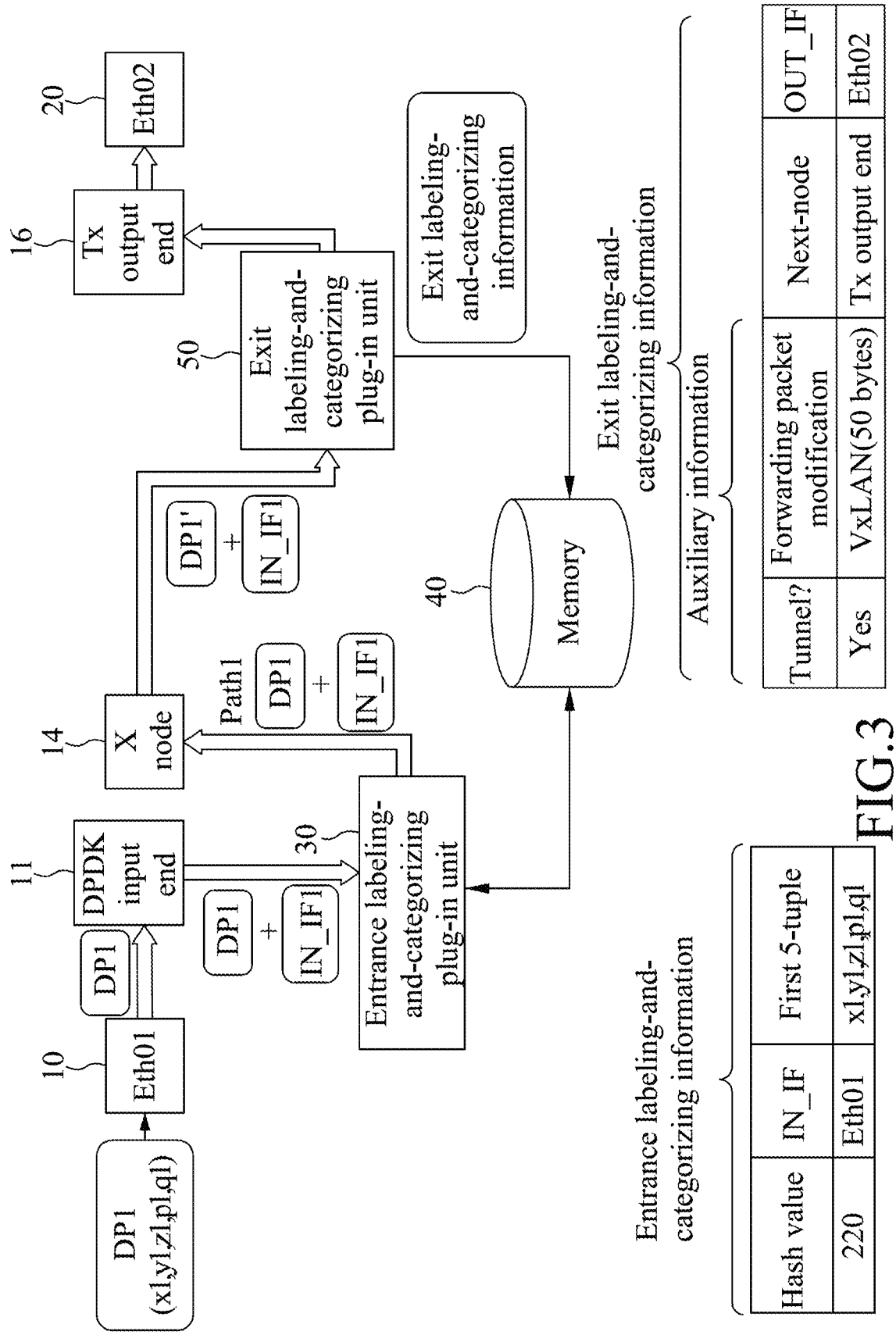
FIG. 3 is a schematic diagram showing a path in a learning-and-recording mode of a vector packet processing according to an embodiment of the present invention, and an example of the categorizing information thereof.

FIG. 3 is a schematic diagram showing a path in a learning-and-recording mode of a vector packet processing according to an embodiment of the present invention, and an example of a categorizing information thereof.

With reference to FIG. 3, in the learning-and-recording mode, firstly, a packet DP1 is received by the Ethernet entrance 10, and then outputted to the DPDK input end 11, wherein the packet DP1 includes a five (5)-tuple (x1, y1, z1, p1, q1) information. Next, the DPDK input end 11 prints out (or generally, to add) an entrance information IN_IF1 to the packet DP1. Thus, the DPDK output end 11 outputs the packet DP1 and the entrance information IN_IF1. In the present embodiment, the entrance information IN_IF1 indicates an entrance where the packet DP1 enters, and includes a value representative of an "Eth01" entrance in the present embodiment.

Although the present embodiment is realized by the 5-tuple, it is merely exemplary and is not limited to the present invention. A skilled person can replace the 5-tuple with the 3-tuple or other suitable communication parameters.

In the present invention, there is an entrance labeling-and-categorizing plug-in unit 30 provided after the DPDK input 11. The entrance labeling-and-categorizing plug-in unit 30 can generate a hash value of the packet DP1, such as "220" in the present embodiment, based on the 5-tuple (x1, y1, z1, p1, q1). The combination of the 5-tuple (x1, y1, z1, p1, q1), the entrance information IN_IF1, and the hash value of the packet DP1 serves as an "entrance labeling-and-categorizing information" of the present invention.

Next, the entrance labeling-and-categorizing plug-in unit 30 stores the entrance labeling-and-categorizing information of the packet DP1 into a memory 40. The entrance labeling-and-categorizing information is summarized in a table shown in the lower left side of the FIG. 3. One benefit of converting a 5-tuple (x1, y1, z1, p1, q1) of the packet DP1 into a hash value is the convenient and quick search of entries of a categorizing information. However, in other embodiments, it is also likely not to use a hash value, but to directly use the 5-tuple (x1, y1, z1, p1, q1) of the packet DP1, as an alternative to find an entry of a categorizing information. If values in other types can facilitate to identify entries of a categorizing information, then it is also possible to convert the 5-tuple (x1, y1, z1, p1, q1) of the packet DP1 into values in the aforesaid other types.

Next, the packet DP1 and the entrance information IN_IF1 are sent to an intermediate node. Only one X node is shown in FIG. 3 as an example for being easily compared to the referential example of FIG. 1. The packet DP1 is processed by the X node 14. As previously mentioned, processing can include executions of matching, modifying, filtering, etc., based on protocols. The X node 14 generates a processed packet DP1', accordingly. However, the processed packet DP1' is still accompanied by the entrance information IN_IF1. Thus, in FIG. 3, the X node 14 outputs the processed packet DP1' and the entrance information IN_IF1 (which are labeled as "DP1'+IN_IF1" in the figure). At the moment, the processed packet DP1' includes an exit labeling-and-categorizing information, wherein the exit labeling-and-categorizing information includes a tunnel, a forwarding packet modification, a next-node, and an exit information (which is labeled as OUT_IF in a table shown in the bottom-right corner of FIG. 3), and wherein the tunnel and the forwarding packet modification are an auxiliary information. The exit labeling-and-categorizing information is shown in a table in the lower right side of FIG. 3.

Here, a concrete example is used to describe the present embodiment. A VxLAN upstream packet is taken as an example of the packet DP1, and a VxLAN node is taken as an example of the X node 14. When the VxLAN upstream packet is outputted to the VxLAN node, the VxLAN node processes the VxLAN upstream packet through the VxLAN protocol, and generates a processed VxLAN upstream packet accordingly. For a VxLAN upstream packet, in general, it is necessary to add a header (called VxLAN header when appropriate) with a plurality of bytes, the plurality of bytes being equal to or larger than 50 bytes. In addition, the VxLAN upstream packet is defined to pass through a tunnel. Thus, the forwarding packet modification information includes a VxLAN header (shown as "VxLan (50 bytes)" in a table in the bottom-right corner of FIG. 3) and a value indicative of a tunnel status is "Yes" (as shown in a table in the bottom-right corner of FIG. 3).

The present embodiment takes a VxLAN node as an example of the X node 14, and thus the auxiliary information includes the tunnel information and the forwarding packet modification information. The aforementioned information is for an explanation purposes only, and is not meant to be a limitation of the present invention. The skilled person may use other auxiliary information, depending on protocols utilized by nodes on a forwarding path.

The next-node refers to a first node immediately subsequent to the exit labeling-and-categorizing plug-in unit 50. Accordingly, in the present embodiment, the next-node is the "Tx output end 16". The exit information OUT_IF indicates an exit where the packet DP1 exits, and includes a value representative of an "Eth02" exit in the present embodiment. In other embodiments, the next node may refer to a first node immediately subsequent to a node that a packet intends to bypass in the optimized acceleration mode. For example, if there is an additional node between the X node 14 and the exit labeling-and-categorizing plug-in unit 50 and if it is intended to bypass the X node 14 in the optimized acceleration mode, the next node can be the additional node subsequent to the X node 14, and is not limited to the Tx output end 16.

Turning back to FIG. 3, after the packet DP1 is processed by the X node 14, the processed packet DP1' and the entrance information IN_IF1 are outputted to the exit labeling-and-categorizing plug-in unit 50. The exit labeling-and-categorizing plug-in unit 50 stores the exit labeling-and-categorizing information of the processed packet DP1' into the memory 40.

Finally, the exit labeling-and-categorizing plug-in unit 50 outputs the processed packet DP1' to the Tx output end 16, and then the processed packet DP1' will be sent out through the Ethernet exit 20.

In some embodiments, the X node 14 can have the functionality of the exit labeling-and-categorizing plug-in unit 50. That is, the X node 14 can provide the exit labeling-and-categorizing information and store the exit labeling-and-categorizing information into the memory 40. In these embodiments, the exit labeling-and-categorizing plug-in unit 50 can be omitted.

On the other hand, in some embodiments, considering that different types of flow may be received in each period of time, and in order to effectively utilize the source of the memory 40, the exit labeling-and-categorizing plug-in unit 50 sets an overtime information (referring to FIG. 7 in advance) and stores the overtime-information together with the exit labeling-and-categorizing information into the memory 40. The overtime-information indicates a survival time of information associated with the packet DP1 stored in the memory 40. The addition of the overtime information can prevent a packet from being accelerated using an acceleration path obtained in a previous topological structure, when a topological structure of nodes is changed and the current topological structure is different from the previous topological structure. For example, the survival time of a specific flow is set 30 seconds. As such, when the specific flow is not used over 30 seconds, the categorizing information associated with the specific flow and stored in the memory 40 is set to be invalid automatically. After invalidation, if that specific flow restarts, the learning-and-recording mode is entered again.

When a packet is received, and if there is no categorizing information associated with the packet stored in the memory 40, a learning-and-recording mode should be executed. On the other hand, if there is an available categorizing information in the memory 40, an optimized acceleration mode can be executed.

(Optimized Acceleration Mode)

Figure 4:
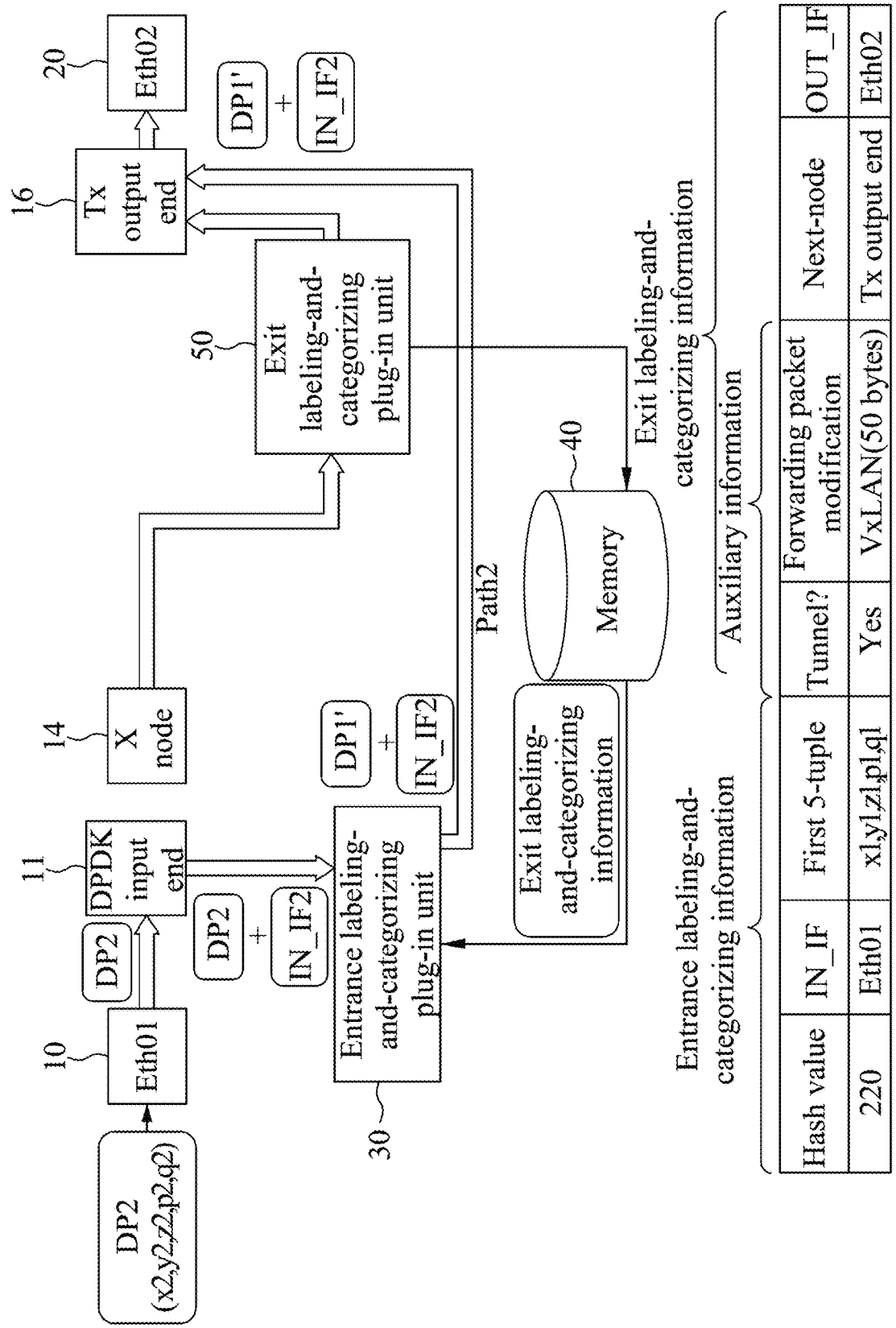
FIG. 4 is a schematic diagram showing a path in an optimized acceleration mode of a vector packet processing according to an embodiment of the present invention, and an example of the categorizing information thereof.

FIG. 4 is a schematic diagram showing a path in an optimized acceleration mode of a vector packet processing according to an embodiment of the present invention, and an example of the categorizing information therein.

With reference to FIG. 4, another packet DP2 is received by the Ethernet entrance 10. The other packet DP2 is different from the packet DP1 in the embodiment of FIG. 3. The other packet DP2 includes another 5-tuple (x2, y2, z2, p2, q2). Next, the DPDK input end 11 adds another entrance information IN_IF2 to the other packet DP2. Thus, in FIG. 4, the DPDK input end 11 outputs the packet DP2 and the entrance information IN_IF2 (which are labeled as "DP2+IN_IF2" in the figure).

For the other packet DP2, the practical applications can be discussed by the two kinds of cases, i.e. an "allowed to be accelerated" case and a "not allowed to be accelerated" case. In the following descriptions, FIG. 4 will be used to describe the "allowed to be accelerated" case firstly.

When the other packet DP2 arrives at the entrance labeling-and-categorizing plug-in unit 30, the entrance labeling-and-categorizing plug-in unit 30 generates a hash value (i.e., "220" in the present embodiment) of the packet DP2 based on the other 5-tuple (x2, y2, z2, p2, q2) of the other packet DP2. The entrance labeling-and-categorizing plug-in unit 30 accesses the memory 40 based on the hash value "220" of the other packet DP2. Since there is a hash value "220" stored in the memory 40, the entrance labeling-and-categorizing plug-in unit 30 can obtain the 5-tuple (x1, y1, z1, p1, q1) and the entrance information IN_IF1 associated with the hash value "220" from the memory 40. The entrance labeling-and-categorizing plug-in unit 30 compares the other 5-tuple (x2, y2, z2, p2, q2) of the packet DP2 with the 5-tuple (x1, y1, z1, p1, q1) of the packet DP1, and compares the other entrance information IN_IF2 with the entrance information IN_IF1 as well. If the 5-tuple (x1, y1, z1, p1, q1) is equal to the other 5-tuple (x2, y2, z2, p2, q2) and if the entrance information IN_IF1 is equal to the other entrance information IN_IF2, the entrance labeling-and-categorizing plug-in unit 30 modifies the other packet DP2 into the processed packet DP1' according to the auxiliary information of the exit labeling-and-categorizing information, and outputs the processed packet DP1' to the next node (i.e., the Tx output end 16) via Path 2 according to the next-node in the exit labeling-and-categorizing information. In the present embodiment, since the next node is the Tx output end 16, the processed packet DP1' can be sent out through the Ethernet exit 20 soon.

As mentioned above, the entrance labeling-and-categorizing plug-in unit 30 executes match regarding a 5-tuple and an entrance information, and executes the necessary processing to the other matched packet DP2 based on the exit labeling-and-categorizing information. The necessary processing includes adding or removing a header to or from a tunnel, an NAT packet modification, a quality of service (QOS), and a flow categorization, etc. As such, the packet DP2 can be modified into the processed packet DP1', and the processed packet DP1' can be directly outputted to the next node according to the next-node provided in the output labeling-and-categorizing information.

On the other hand, for the "not allowed to be accelerated" case, if the entrance labeling-and-categorizing plug-in unit 30 determines that a hash value of the other packet DP2 is different from a hash value of the previous packet DP1, the entrance labeling-and-categorizing plug-in unit 30 recognizes that the other packet DP2 is not allowed to be accelerated. The match determination of the 5-tuple and the entrance information, which are associated with the other packet DP2, is not executed, and the other packet DP2 is determined to need to be executed with the entire process of the learning-and-recording mode. As mentioned above, the advantage of the conversion of the 5-tuple into the hash value is the convenient and quick search of entries of the categorizing-information.

No matter whether the hash value is introduced, if the other 5-tuple (x2, y2, z2, p2, q2) of the latter packet DP2 is not equal to the 5-tuple (x1, y1, z1, p1, q1) of the previous packet DP1, or the other entrance information IN_IF2 of the latter packet DP2 is not equal to the entrance information IN_IF1 of the previous packet DP1, the entrance labeling-and-categorizing plug-in unit 30 still determines that there is a need to execute the entire process of the learning-and-recording mode for the other packet DP2.

Any of a hash-value mismatch, a 5-tuple mismatch and an entrance-information mismatch is the "not allowed to be accelerated" case. It can be seen that, the major concept of the present invention lies in that if the entrance labeling-and-categorizing information of the other packet DP2 is different from the entrance labeling-and-categorizing information, obtained in the executed learning-and-recording mode, of the packet DP1, then the other packet DP2 needs to execute the entire process of the learning-and-recording mode.

Figure 5:
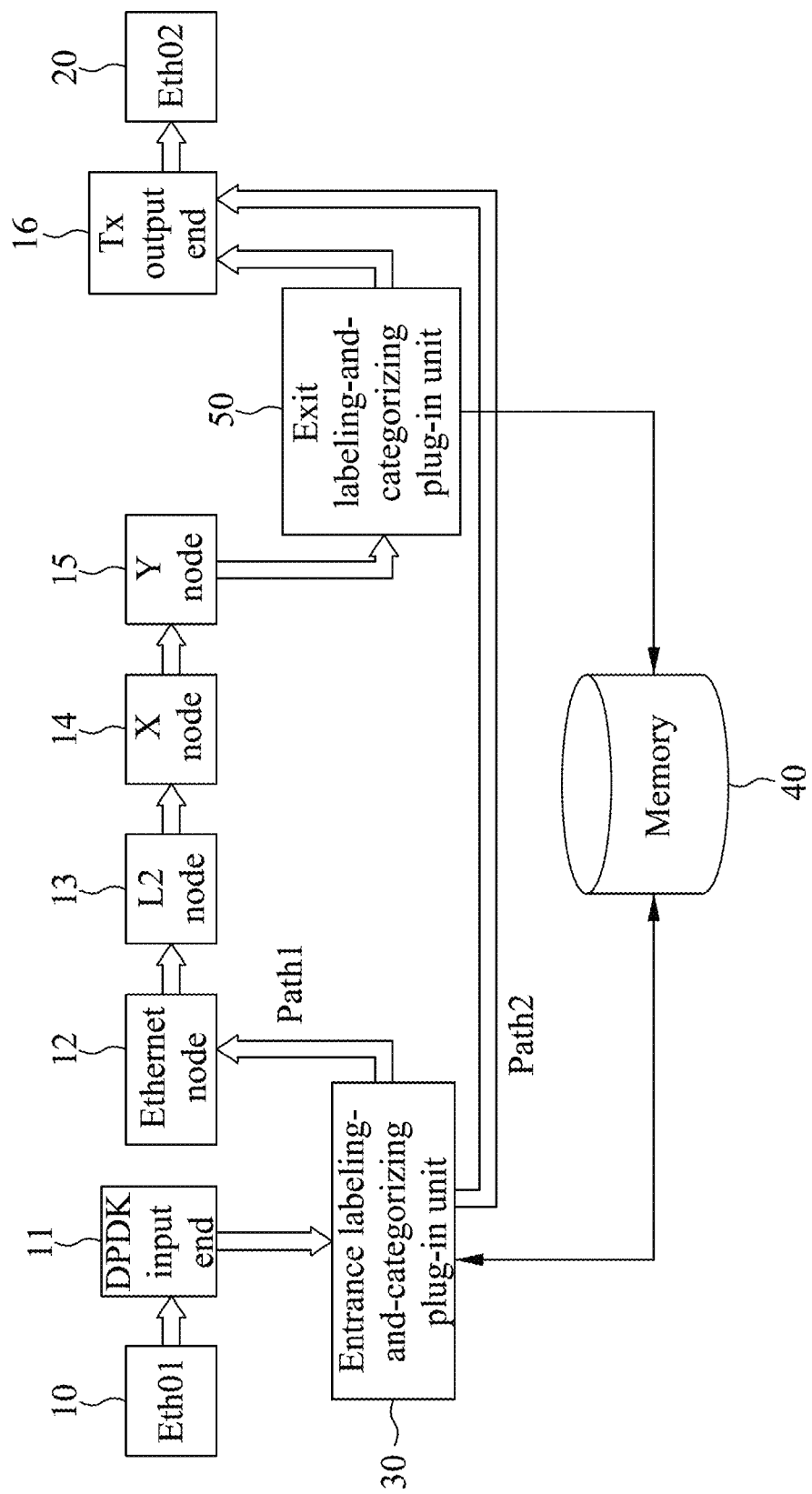
FIG. 5 shows a path of a vector packet processing according to another embodiment of the present invention.
Figure 6:
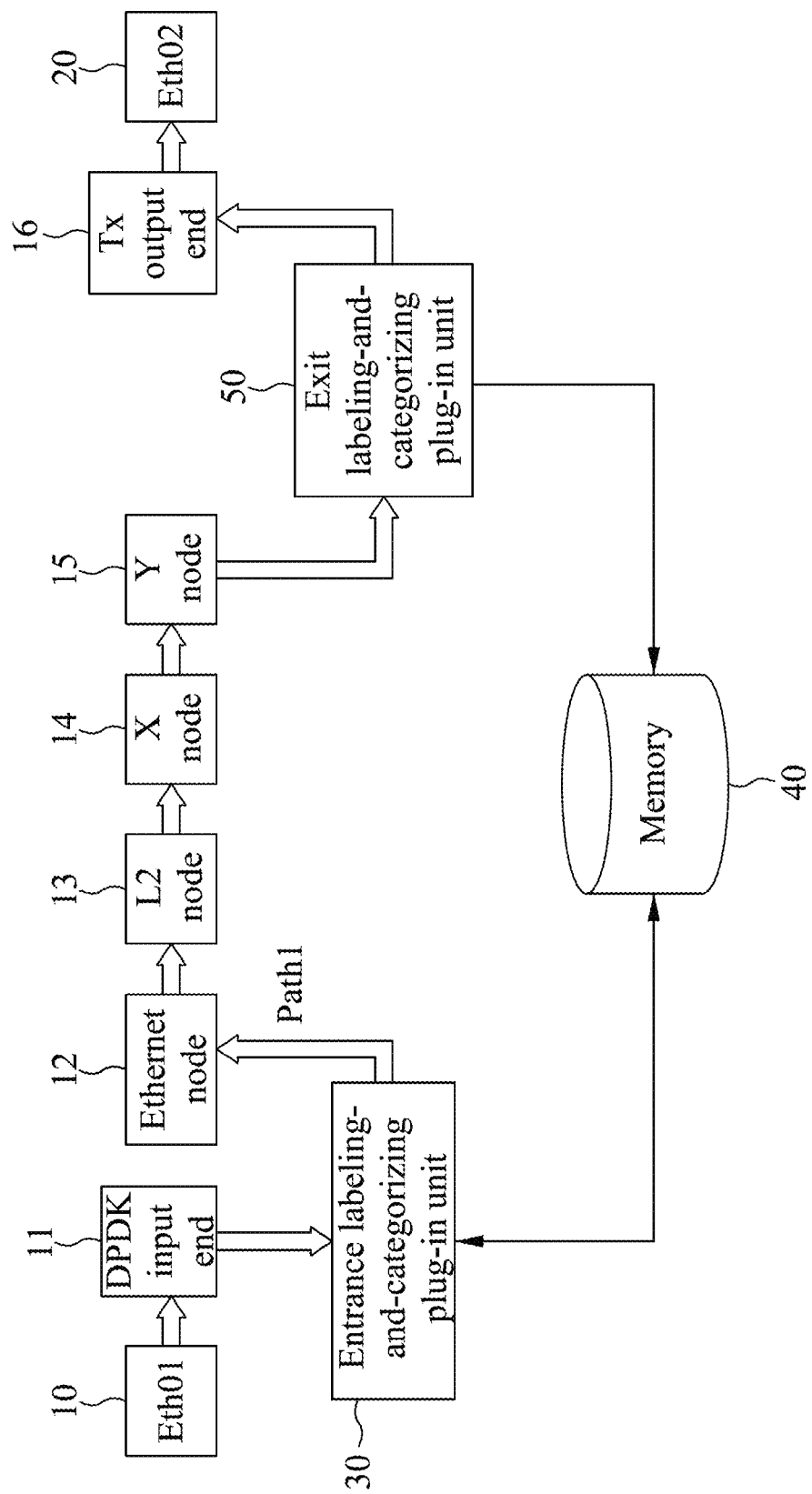
FIG. 6 shows a path in a learning-and-recording mode of a vector packet processing according to anther embodiment of the present invention.
Figure 8:
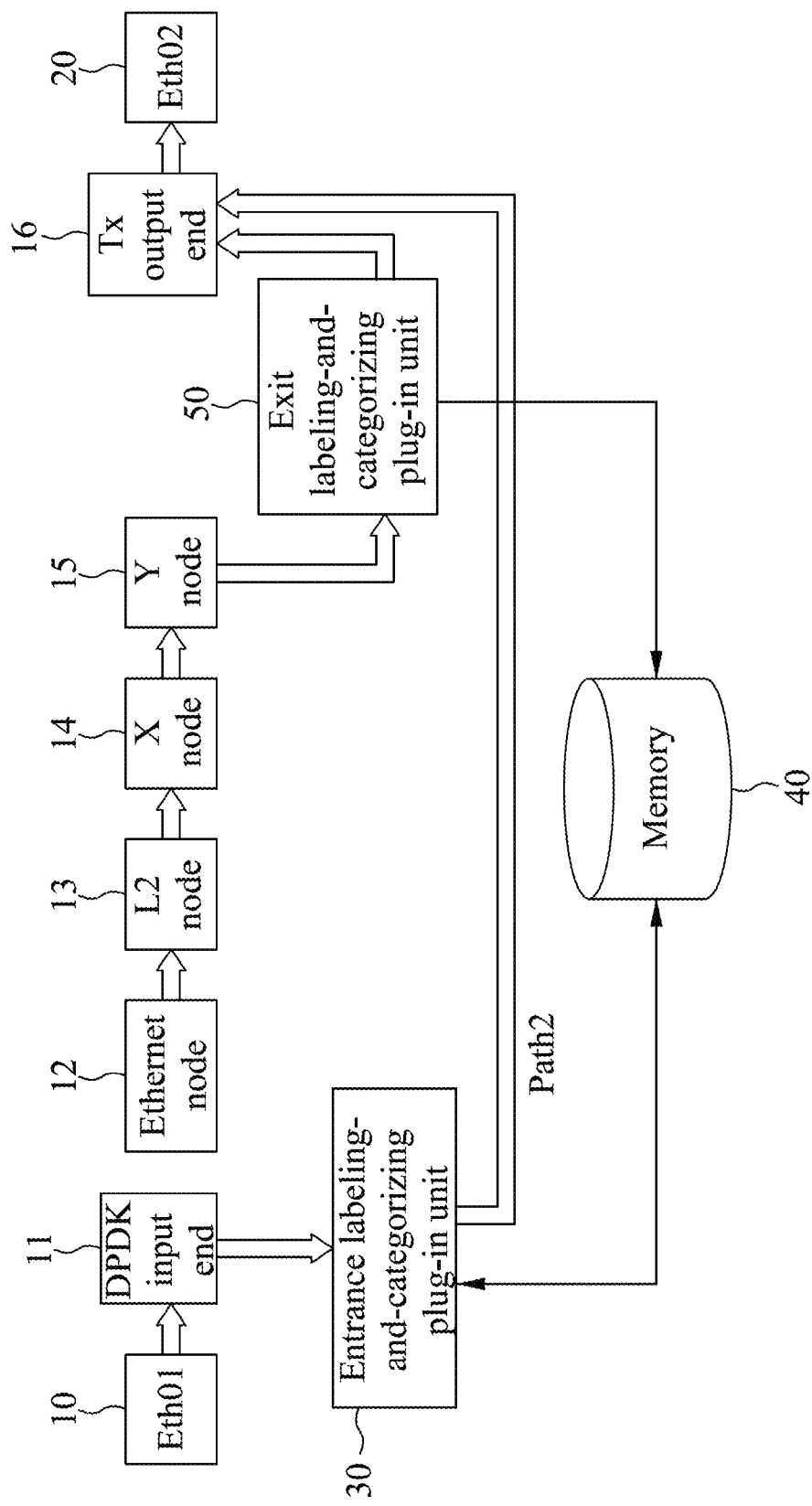
FIG. 8 shows a path in an optimized acceleration mode of a vector packet processing according to another embodiment of the present invention.

FIG. 5 shows a path of a vector packet processing according to another embodiment of the present invention. FIG. 6 shows a path in a learning-and-recording mode of a vector packet processing according to anther embodiment of the present invention. FIG. 7 shows an example of the categorizing information according to another embodiment of the present invention. FIG. 8 shows a path in an optimized acceleration mode of a vector packet processing according to another embodiment of the present invention.

In the previous referential example of FIG. 1 and the embodiments of FIG. 2, FIG. 3, and FIG. 4, only one intermediate node for packet processing is schematically illustrated; however, in general, the forwarding path of a vector packet processing may include a plurality of intermediate nodes for packet processing. Thus, in the other embodiments of FIG. 5 to FIG. 8, the forwarding path of the vector packet processing includes more intermediate nodes.

In further detail, as shown in FIG. 5, in the forwarding path of the vector packet processing of the present embodiment, the architecture includes an Ethernet entrance 10, an DPDK input end 11, an entrance labeling-and-categorizing plug-in unit 30, an Ethernet node 12, an L2 node 13, an X node 14, a Y node 15, and an exit labeling-and-categorizing plug-in unit 50, a Tx output end 16, and an Ethernet exit 20. Here, the X node and the Y node are designation. The X node and the Y node, for example, can be a filter node, an access control list (ACL) node, a tunnel node, an IPSec node, a VxLAN node, etc. The number of intermediate nodes can be further increased or decreased, depending on the practical application, but not limited to four nodes, i.e., the nodes 12-15 shown in FIG. 5. In FIG. 5, the forwarding path of the vector packet processing includes a Path 1 and a Path 2, wherein the Path 1 is a path in a learning-and-recording mode of packets, while the Path 2 is a path in an optimized acceleration mode of packets.

With reference to FIG. 6, FIG. 6 is similar to FIG. 5, but it merely shows the path in the learning-and-recording mode of the vector packet processing for ease of observation.

It should be noted that, in the learning-and-recording mode, the packet DP1 passes through all of the intermediate nodes 12 to 15. In one possible circumstance, all the intermediate nodes 12 to 15 process the packet DP1. However, in another possible circumstance, only some of the intermediate nodes 12 to 15 process the packet DP1. For example, in a case that the packet DP1 is a VxLAN upward packet and the X node is a VxLAN node, the VxLAN upward packet still passes through the Ethernet node 12, the L2 node 13, the X node 14, and the Y node 15, but only the X node 14 processes the VxLAN upward packet. Other intermediate nodes will not process the VxLAN upward packet. That is, the VxLAN upward packet merely passes through these intermediate nodes.

Next, with reference to FIG. 8, FIG. 8 is similar to FIG. 5, but it merely shows a path in an optimized acceleration mode of the vector packet processing for ease of observation. In the path of the optimized acceleration mode of the vector packet processing, when the other packet DP2 arrives at the entrance labeling-and-categorizing plug-in unit 30, the entrance labeling-and-categorizing plug-in unit 30 generates a hash value of the other packet DP2 based on the other 5-tuple (x2, y2, z2, p2, q2) of the other packet DP2. Since both the hash value of the other packet DP2 and the hash value, obtained in the learning-and-recording for packet DP1, of the packet DP1 are 220, the entrance labeling-and-categorizing plug-in unit 30 further compares the other 5-tuple (x2, y2, z2, p2, q2) of the other packet DP2 with the 5-tuple (x1, y1, z1, p1, q1) of the packet DP1, and compare the other entrance information of the other packet DP2 with the entrance information of the packet DP1. If both results are determined as matching (equal), the packet DP2 executes the optimized acceleration mode.

In the optimized acceleration mode, the other packet DP2 can bypass some of the plurality of intermediate nodes and directly arrives at the Tx output end 16 by means of the entrance labeling-and-categorizing plug-in unit 30 via the Path 2.

Therefore, according to the present invention, for a packet that passes through a path in the optimized acceleration mode of the vector packet processing, a plurality of intermediate nodes (which are allowed to be detoured) is bypassed, resulting in reduction of overhead of packet processing. Therefore, performance of forwarding a packet is improved.

Finally, the categorizing-information in FIG. 7 is described. The categorizing-information can include but not limited to a hash value, an entrance information (IN_IF), a 5-tuple, a tunnel, a forwarding information modification, a next-node, an exit information (OUT_IF), an overtime, etc. A hash value representative of a specific 5 tuple can help to quickly identify entries of categorizing-information. The next node represents one node to which the packet can be directly outputted by the entrance labeling-and-categorizing plug-in unit 30 bypassing some of the plurality of intermediate nodes. The 5 tuple can include but not limited to a source address, a destination address, a protocol number, a source port, a destination port. It can be expanded to include more information, such as for example to include information on capability of supporting Ethernet.

In conclusion, in an optimized method for forwarding a vector packet processing of the present invention, with labeling-and-categorizing plug-in, insufficiency of existing approaches is improved by executing a learning-and-recording mode and an optimized acceleration mode. As a result, the best of both world of the intellectualization and the high performance is achieved.

Although the present invention has been explained in relation to its preferred embodiment, it is to be understood that many other possible modifications and variations can be made without departing from the spirit and scope of the invention as hereinafter claimed.

What is claimed is:

1. A method for forwarding a vector packet processing (VPP), applicable to a forwarding path, the forwarding path comprising an interface entrance, a data plane development kit (DPDK) input end, an entrance labeling-and-categorizing plug-in unit, one or more intermediate nodes, a Tx output end, an exit labeling-and-categorizing plug-in unit, and an interface exit, the vector packet processing forwarding method comprising:
   executing a learning-and-recording mode for a preceding packet to obtain a learning result, and in the learning-and-recording mode having the preceding packet entirely pass through the forwarding path; and
   executing an optimized acceleration mode for a subsequent packet, and in the optimized acceleration mode, based on the learning result, having the subsequent packet bypass at least one intermediate node of the one or more intermediate nodes in the forwarding path.

2. The method for forwarding a vector packet processing as claimed in claim 1, wherein the learning-and-recording mode comprises:
   receiving the preceding packet by the interface entrance, the preceding packet comprising a 5-tuple; and
   adding an entrance information by the DPDK input end based on the preceding packet, wherein the learning result comprises the 5-tuple and the entrance information.

3. The method for forwarding a vector packet processing as claimed in claim 2, wherein the learning-and-recording mode further comprises:
   generating a hash value of the preceding packet by the entrance labeling-and-categorizing plug-in unit based on the 5-tuple of the preceding packet, wherein the learning result comprises the hash value.

4. The method for forwarding a vector packet processing as claimed in claim 3, wherein the learning-and-recording mode further comprises:
   storing an entrance labeling-and-categorizing information into a memory by the entrance labeling-and-categorizing plug-in unit, wherein the entrance labeling-and-categorizing information comprises the 5-tuple, the entrance information, and the hash value, and wherein the learning result comprises the entrance labeling-and-categorizing information.

5. The method for forwarding a vector packet processing as claimed in claim 4, wherein the learning-and-recording mode further comprises:
   processing the preceding packet by the at least one intermediate node of the one or more intermediate nodes and generating a processed packet, the processed packet comprising an exit labeling-and-categorizing information, wherein the learning result comprises the exit labeling-and-categorizing information;
   storing the exit labeling-and-categorizing information of the processed packet into the memory by the exit labeling-and-categorizing plug-in unit; and
   outputting the processed packet to the Tx output end by the exit labeling-and-categorizing plug-in unit.

6. The method for forwarding a vector packet processing as claimed in claim 5, wherein the exit labeling-and-categorizing information comprises an auxiliary information and a next-node.

7. The method for forwarding a vector packet processing as claimed in claim 5, wherein the method for forwarding a vector packet processing further comprises:
   receiving the subsequent packet by the interface entrance, the subsequent packet comprising another 5-tuple;
   adding another entrance information to the subsequent packet by the DPDK output end based on the subsequent packet; and
   generating another hash value of the subsequent packet based on the subsequent packet, and accessing the memory based on the other hash value by the entrance labeling-and-categorizing plug-in unit.

8. The method for forwarding a vector packet processing as claimed in claim 7, wherein when the other hash value of the subsequent packet is not equal to the hash value of the preceding packet, the entrance labeling-and-categorizing plug-in unit requires the subsequent packet to entirely pass through the forwarding path.

9. The method for forwarding a vector packet processing as claimed in claim 7, wherein the method for forwarding a vector packet processing further comprises:
   comparing the other hash value with the hash value and comparing the other entrance information with the entrance information by the entrance labeling-and-categorizing plug-in unit, wherein when the other 5-tuple is equal to the 5-tuple and the other entrance information equal to the entrance information, executing the optimized acceleration mode.

10. The method for forwarding a vector packet processing as claimed in claim 9, wherein the optimized acceleration mode further comprises: modifying the subsequent packet into the processed packet according to the auxiliary information of the exit labeling-and-categorizing information, and directly outputting the processed packet to a next node in the forwarding path according to the next-node of the exit labeling-and-categorizing information by the entrance labeling-and-categorizing plug-in unit.

11. The method for forwarding a vector packet processing as claimed in claim 10, wherein the next node is the Tx output end or one node after the at least one intermediate node that processes the preceding packet in the one or more intermediate nodes.

12. The method for forwarding a vector packet processing as claimed in claim 9, when the other 5-tuple is not equal to the 5-tuple or when the other entrance information is not equal to the entrance information, the entrance labeling-and-categorizing plug-in unit requires the subsequent packet to entirely pass through the forwarding path.

13. The method for forwarding a vector packet processing as claimed in claim 5, wherein the exit labeling-and-categorizing plug-in unit sets an overtime and stores the overtime into the memory along with the exit labeling-and-categorizing information, the overtime indicating a survival time of the entrance labeling-and-categorizing information and the exit labeling-and-categorizing information stored in the memory.

* * * * *